Figure 1:
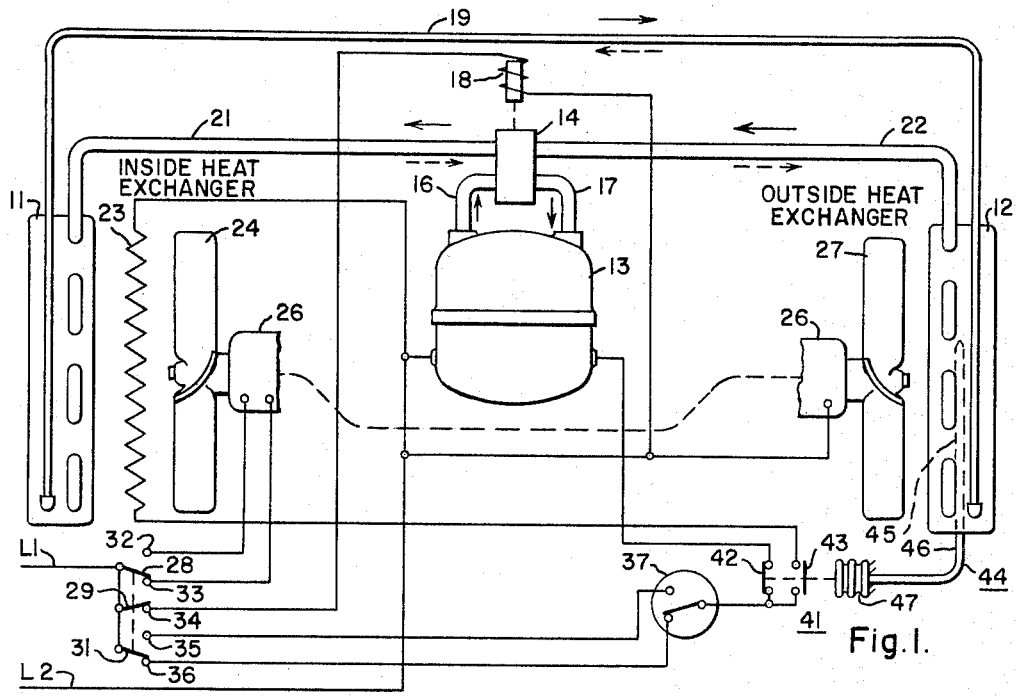

Nov. 8, 1966

A. H. EBERHART 3,283,809

AIR CONDITIONING APPARATUS

Filed May 18, 1964

INVENTOR
Arthur H. Eberhart
BY

United States Patent Office 3,283,809
Patented Nov. 8, 1966

3,283,809
AIR CONDITIONING APPARATUS
Arthur H. Eberhart, Hilliard, Ohio, assignor to Westinghouse Electric Corporation, Pittsburgh, Pa., a corporation of Pennsylvania
Filed May 18, 1964, Ser. No. 368,019
2 Claims. (Cl. 165—29)

This invention relates to apparatus for conditioning the air of an enclosure, and more particularly to heat pump apparatus and the control thereof.

Many present day air conditioning units are provided with heat pump systems which permit the unit to be used to extract heat from outdoor air and add this heat to indoor air for room heating purposes. These units generally, are of the reversible heat pump type which provide for both heating and cooling the enclosure.

A serious factor limiting the use of heat pump systems in removing heat from lower temperature outdoor air, is the accumulation of excessive frost on the outdoor heat exchanger of the unit when the heat exchanger is operating at a temperature in the area of 32° F. Such units, therefore, generally are provided with a supplemental heating means such as a resistance heater for providing heat to the enclosure when the outside ambient is at a low temperature, the heat pump apparatus being shutdown during this period.

Heretofore, prior attempts to utilize a single change over control that would be effective to change over from heat pump operation to resistance heating on a drop in ambient temperature to a specified range, and cut in after a rise through a predetermined differential in temperature, have proved unsatisfactory. The determining of the aforementioned temperatures is made difficult due to variations in compressors, air flows, and control calibrations, all of which are factors to be considered in heat exchanger frostup. Even a change in wind direction will start frosting at an otherwise clear coil temperature and humidity. The start of frostup is often quite imperceptible during laboratory test observations, but once started it is cumulative, and will result in a complete frostover of the heat exchanger if the heat pump is allowed to run continuously for sufficient time without change over.

Should a suitable change over temperature be arrived at, it is found that there is a differential of at least 7° F. inherent in change over controls available on the market. Such a control when set to change over to supplemental heating on a drop in temperature to 45° F. would continue on resistance heat until the ambient warmed to at least 52° F. The operation through the higher temperature range on supplemental heating provides a coefficient of performance less than unity, which is undesirable.

An additional problem is provided when customers desire cooling with the outside ambient in the 40's or lower. With a unit having a single change over control responsive to the ambient, the apparatus can deliver heat to the room even though the unit controls called for cooling.

Additional factors that affect the maximum ambient to cause frostup are high vs. low fan operation, and outside humidity level. Low fan and/or moderately low humidity increase the ambient temperature at which frostup occurs and therefore laboratory tests are necessary at these settings. However, the control setting based on these factors would result in considerable operation at combinations of high fan and high humidity, which are not conducive to frostup, and under which the unit would be running at a low coefficient of performance, operating on resistance heat.

It is therefore an object of the present invention to provide air conditioning apparatus having a new and improved change over from heat pump operation to supplemental heating.

Another object of the invention is to prevent frostup occurring on the outside heat exchanger in a heat pump application.

A further object of the invention is to provide a method of operating an air conditioning apparatus to prevent frost formation on the outside heat exchanger.

These objects of the invention, and other objects which will become apparent as the description proceeds, are achieved by providing a control capillary of the limited vapor fill type having a portion in contact with the outside heat exchanger of the refrigerating system, and a portion subject to the ambient outside the enclosure to be conditioned. The control, being of the limited vapor fill type, responds to the coldest portion of the capillary. At a stabilized heat pump off cycle, the control responds to ambient temperature, while during operation the control responds either to ambient temperature or refrigerant temperature, whichever is cooler. A proper selection of predetermined temperatures for heat pump cut in, and heat pump cut out, provides an air-conditioning unit which operates at a high coefficient of performance over the entire heating range.

Figure 2:
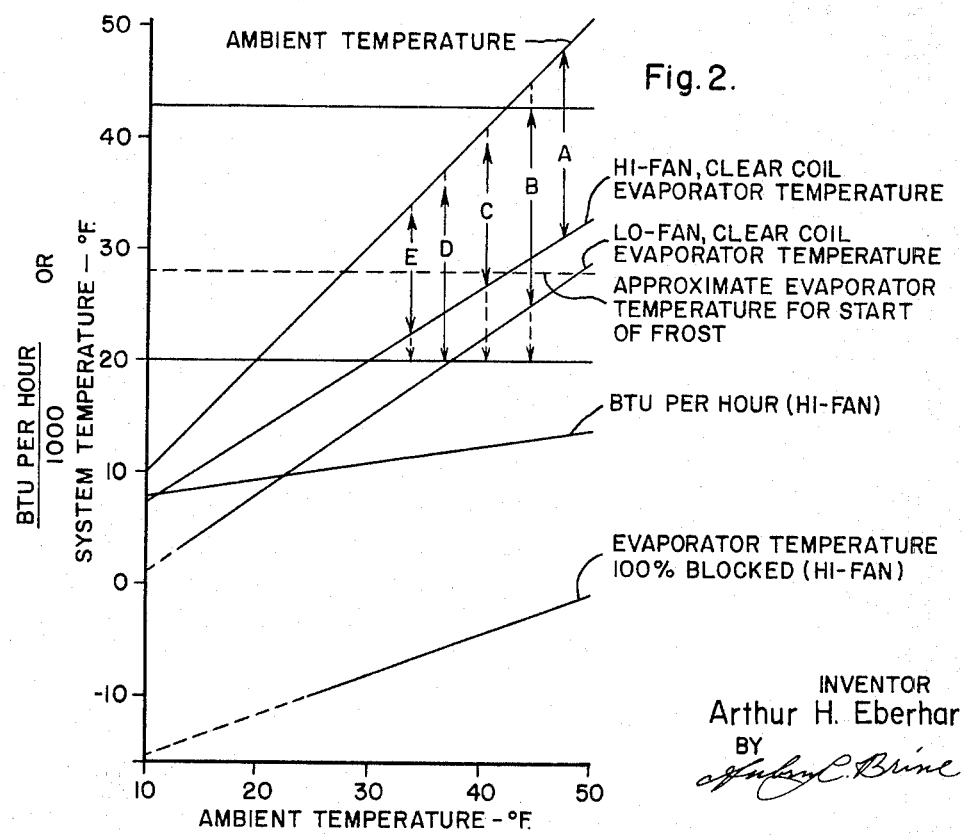

The invention is explained in greater detail in the detailed description which follows wherein reference is made to the accompanying drawings, forming a part hereof, wherein:

FIGURE 1 is a schematic illustration showing air conditioning apparatus embodying the invention; and FIG. 2 is a plot of curves showing operating characteristics of a typical air conditioning system as illustrated in FIG. 1.

The air conditioning apparatus as illustrated in FIG. 1 comprises a conventional compression refrigeration system including an indoor, or inside, heat exchanger 11, an outdoor, or outside, heat exchanger 12 and a compressor 13 for circulating a heat transfer fluid through the two heat exchangers. The fluid circuit further includes a reversing valve 14 which is connected to the compressor inlet and outlet by means of a suction line 16 and a hot gas line 17, and is electrically controlled by a solenoid 18. The fluid circuit between heat exchangers 11 and 12 is completed by an expansion device 19, in the form of a long, small bore tube, commonly termed a capillary tube.

Reversing valve 14 is adapted to direct hot gaseous refrigerant through a conduit 21 to indoor heat exchanger 11 and direct to the compressor inlet cooled vaporous refrigerant returning from outside coil 12 via another conduit 22, as indicated by the solid line arrows, or to reverse the direction of refrigerant flow and direct warm vaporous refrigerant to outside heat exchanger 12 and direct to the compressor inlet cool refrigerant from inside heat exchanger 11, as indicated by the dotted line arrows.

As is well understood, heat is absorbed by whichever of the two heat exchangers, 11 and 12, having refrigerant withdrawn therefrom by compressor 13, and heat is dissipated by the other heat exchanger to which warm vaporous fluid is being pumped by the compressor 13.

In addition to the inside heat exchanger 11, there is provided a supplemental heating means in the form of an electric resistance heater 23 for providing heat to the enclosure to be air conditioned.

The indoor heat exchanger 11 and the heater 23 have associated therewith means for propelling indoor air thereover, including a fan 24 which is driven by an electric motor 26. Similarly, outdoor air is circulated over the outside heat exchanger 12 by means of another fan 27 connected to the electric motor 26. The various elements of the system including the fan motor 26, compressor 13, heater 23, and solenoid 18 are energized by electrical current from a common supply system designated in the drawings as lines L1 and L2.

The supply line L1 terminates in a series of switch pointts having arms 28, 29 and 31 connected thereto. The switch arm 28 when in contact with a contact point 32 effects operation of the motor 26 at a low rate of speed, and is movable to a contact point 33 in which position the motor is operated at a high rate of speed. The switch arm 29 when in contact with contact point 34 energizes the solenoid 18 to cause flow of warm refrigerant to the inside heat exchanger 11, and provide heat to the enclosure. On disconnecting the arm 29 from the point 34, refrigerant flow is reversed to provide cooling in the heat exchanger 11 and heat is produced at the heat exchanger 12.

The switch arm 31 is movable between points 35 and 36 which are connected to a room thermostat 37. The switch arm 31 is positioned in contact with point 35 when a heat cycle is called for by the user, and is placed in contact with point 36 when a cooling cycle is required. The room thermostat 37 is thereby used for controlling both a heating and cooling operation of the system.

All of the above-described components of the air conditioning apparatus are commonly employed in so-called "reversible" air conditioning units and are normally housed in a casing (not shown) which includes suitable partitions, or baffles, for directing and separating indoor and outdoor air.

When the system is functioning to heat the air of an enclosure, the outside heat exchanger 12 operates as an evaporator to absorb heat from the ambient outside the enclosure and outside air is propelled over the evaporator by the fan 27. Quite naturally, when conditions are such as to make it desirable to warm the air of an enclosure, the outdoor temperature is relatively lower than that of the enclosure, and often near the freezing temperature of water. In order to absorb heat, the heat exchanger 12 must operate at a still lower temperature, and consequently, should the refrigeration system continue to operate, frost will form on the outside heat exchanger. It is during this low temperature operation that a change over from heat pump operation to resistance heating is required to eliminate frost formation on the heat exchanger 12.

In accordance with the present invention, a unique application of a change over control calibrated to applicable settings is provided to energize the compressor 13 and deenergize the heater 23 at a predetermined temperature, and to energize the heater 23 and deenergize the compressor 13 at a second predetermined temperature.

As shown in FIG. 1, the compressor 13 is connected to the electrical circuit through a control element designated by the numeral 41, which element has a pair of movable arms 42 and 43. The electric heater 23 is also connected into the circuit through the control element 41, and the control arms 42 and 43 are movable to a position to energize the compressor 13 and deenergize the heater 23, or to energize the heater 23 and deenergize the compressor 13 in the position as shown. Control elements of the type described are not novel, and may be of any type well known in the art.

A temperature sensing means in the form of a control capillary 44 of the limited vapor fill type is installed having a portion 45 adjacent the outside heat exchanger 12 for sensing temperature of the refrigerant in the heat exchanger. The capillary 44 also has a second portion 46 more remote from the heat exchanger 12, which portion is effective to sense the ambient flowing adjacent the heat exchanger. The capillary 44 is attached to a bellows 47 and the arms 42 and 43 of the control element 41 are responsive to the coldest portion of the sensing element 44 (the element being of the limited vapor fill type). The control element 41 is calibrated such that the arm 42 moves to the closed position at a sensed temperature of approximately 43° F. opening the contacts previously closed by the arm 43 and the arm 43 closes the contacts to the heater 23 at a sensed temperature of approximately 20° F. opening the contacts previously closed by the arm 42. By employing a limited vapor fill control capillary, and positioning the capillary as described, the control responds to the coldest portion of the capillary and at a stabilized heat pump off cycle the control will respond to ambient temperature.

For a clearer understanding of the operation of the unit under various ambient temperatures, reference should be had to FIG. 2 where operating conditions of a typical unit have been plotted.

As shown by the line A plotted on FIG. 2, with an outside ambient of 48° F. and high fan operation, the refrigeration system operates to pull the refrigerant temperature down to approximately 31° F., at which temperature the system will operate continuously without change over.

Referring now to the line B plotted on FIG. 2, with the controls set for low fan operation and the thermostat 37 calling for heat in the enclosure, at an outside ambient of 45° F., the refrigeration system will operate past 28° F. at which point frost starts to accumulate at the outside heat exchanger. Under the present control system, the heat pump continues to operate, and frostup will continue down to 20° F. at which point the portion 45 of the sensing element 44 senses the low refrigerant temperature and a change over occurs to resistance heat. Should the thermostat control 37 cease to call for heating prior to the heat exchanger temperature reaching 20°, the heat pump would shutdown and the refrigerant would heat up to the ambient temperature without change over to resistance heat. However, should change over occur due to a drop to 20° F., the frost will melt slowly as the refrigerant is warmed by the outside ambient, and when the coil fins become sufficiently dry (which usually requires an hour or more) the capillary will sense 43° F. and cut back to heat pump operation.

Line C of FIG. 2 shows initiation of heat pump operation at 41° F. accompanied by high fan operation. Under this set of conditions, operation is similar to a pull down from a refrigerant temperature of 45°, with the exception that after initiation of resistance heating, the heat pump will not cut in after deice, but will remain off until the outside ambient rises to 43° F. due to weather change.

The line D plotted on FIG. 2 shows a condition wherein operation of the unit is initiated at 37° F. with the fan control set for low fan operation. The refrigerant temperature will drop to 20° F. (as in condition C) and cut in to resistance heat which continues until the ambient rises to 43° F.

Line E of FIG. 2 shows initiation of compressor operation at an outside ambient of 34° F. with the controls calling for high fan operation. The refrigeration system will operate to decrease the refrigerant temperature to approximately 22° F. at which temperature frost formation continues. Should the thermostat control still call for heating, the compressor continues to operate to 20° F. refrigerant temperature, at which point change over to resistance heat begins. The resistance heater 23 will continue to operate until the outside ambient rises again to 43° F.

From the foregoing, it should be evident that the novel apparatus provided by the present invention, and method of operating an air conditioning unit according to the present invention, increases the efficiency of an air conditioning unit. This increased efficiency is caused by preventing frost formation at the outside heat exchanger, and by operation of the heat pump through the critical point at which frost begins to form.

While the invention has been shown in but one form, it will be obvious to those skilled in the art that it is not so limited, but is susceptible of various changes and modifications without departing from the spirit thereof.

What is claimed is:

1. Apparatus for conditioning the air of an enclosure, comprising:
    a refrigerating system having
        an outside heat exchanger,
        an inside heat exchanger and
        a compressor for circulating heat transfer fluid through said heat exchangers to absorb heat at said outside heat exchanger and dissipate heat at said inside heat exchanger,
    temperature sensing means disposed within the confines of said outside heat exchanger through which outside air passes so that said sensing means is blocked from passage of said outside air thereover in accordance with blocking of said outside heat exchanger when frost accumulates on said outside heat exchanger, whereby under a condition of increasing frost accumulation on said heat exchanger said sensing means is increasingly subject to said transfer fluid temperature in said outside heat exchanger and decreasingly subject to said outside air temperature,
    control means responsive to said temperature sensing means effective to initiate operation of said compressor at an upper predetermined temperature and effective to terminate operation of said compressor at another predetermined lower temperature in a range of about 15° F. to 25° F., said lower temperature permitting continued operation of said apparatus as a heat pump with said outside heat exchanger accumulating frost until sufficient blocking of said outside heat exchanger materially reduces the effect of the outside air temperature upon said sensing means and said sensing means closely reflects said transfer fluid temperatures.

2. Apparatus according to claim 1 including:
    electrical resistance heating means for said enclosure; and
    said control means is adapted to energize and deenergize said resistance heating means upon terminating and initiating, respectively, operation of said compressor.

References Cited by the Examiner
UNITED STATES PATENTS
2,847,190  8/1958  Slattery et al. _____ 165—17

References Cited by the Applicant
UNITED STATES PATENTS
2,934,323  4/1960  Burke.
2,988,896  6/1961  Swart.

ROBERT A. O'LEARY, *Primary Examiner.*
CHARLES SUKALO, *Examiner.*